Oct. 31, 1967    R. E. SHADDOCK    3,350,139
MATERIALS TRANSPORTING APPARATUS
Filed July 22, 1966    5 Sheets-Sheet 1

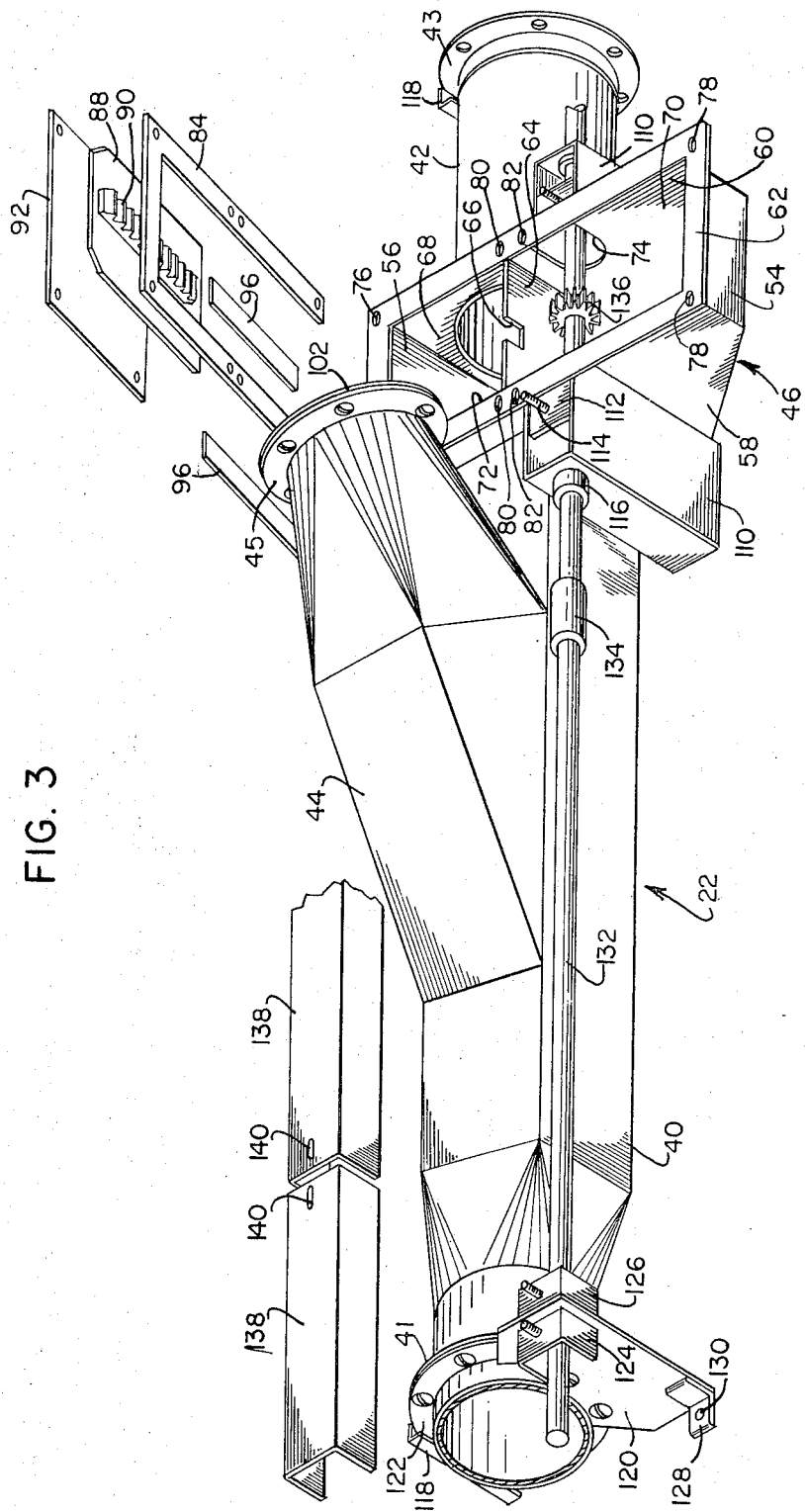

Oct. 31, 1967 R. E. SHADDOCK 3,350,139
MATERIALS TRANSPORTING APPARATUS
Filed July 22, 1966 5 Sheets-Sheet 3
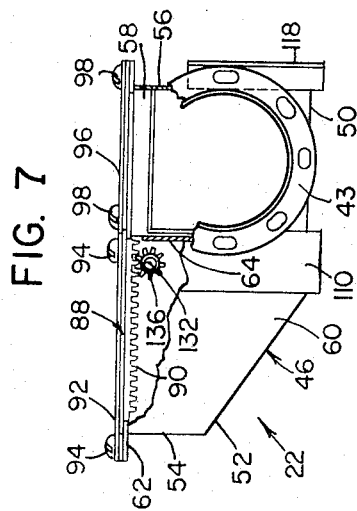
FIG. 7
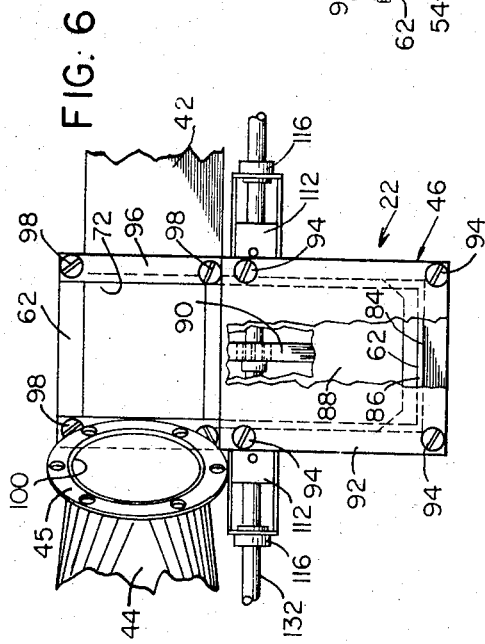
FIG. 6
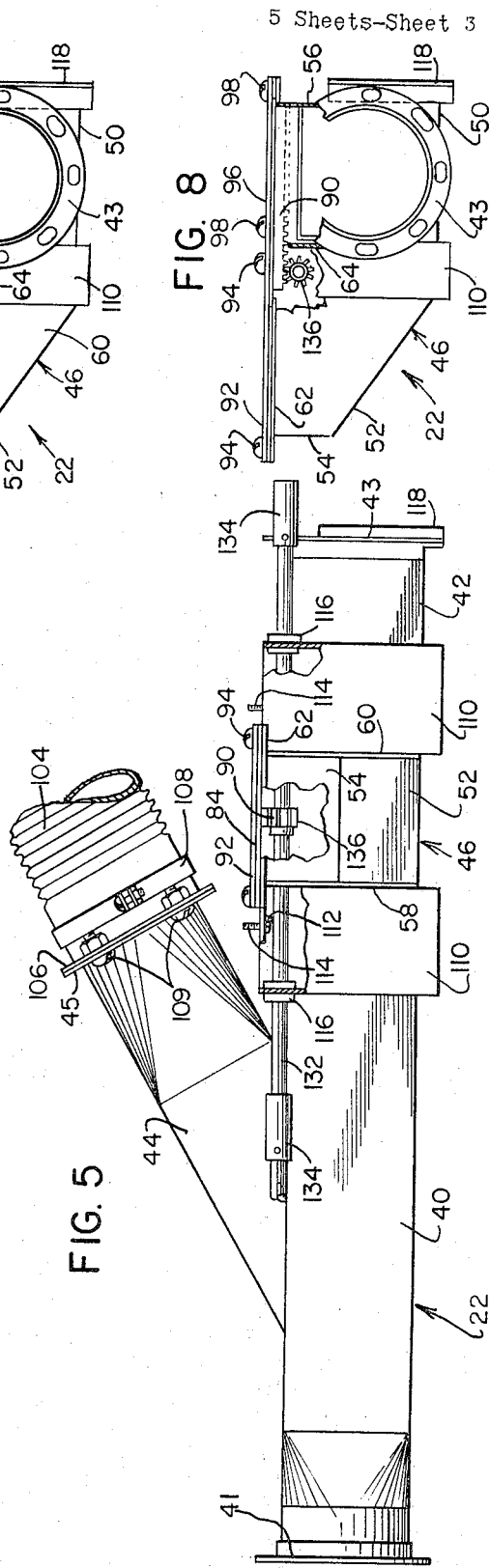
FIG. 8
FIG. 5

Oct. 31, 1967   R. E. SHADDOCK   3,350,139
MATERIALS TRANSPORTING APPARATUS
Filed July 22, 1966   5 Sheets-Sheet 4

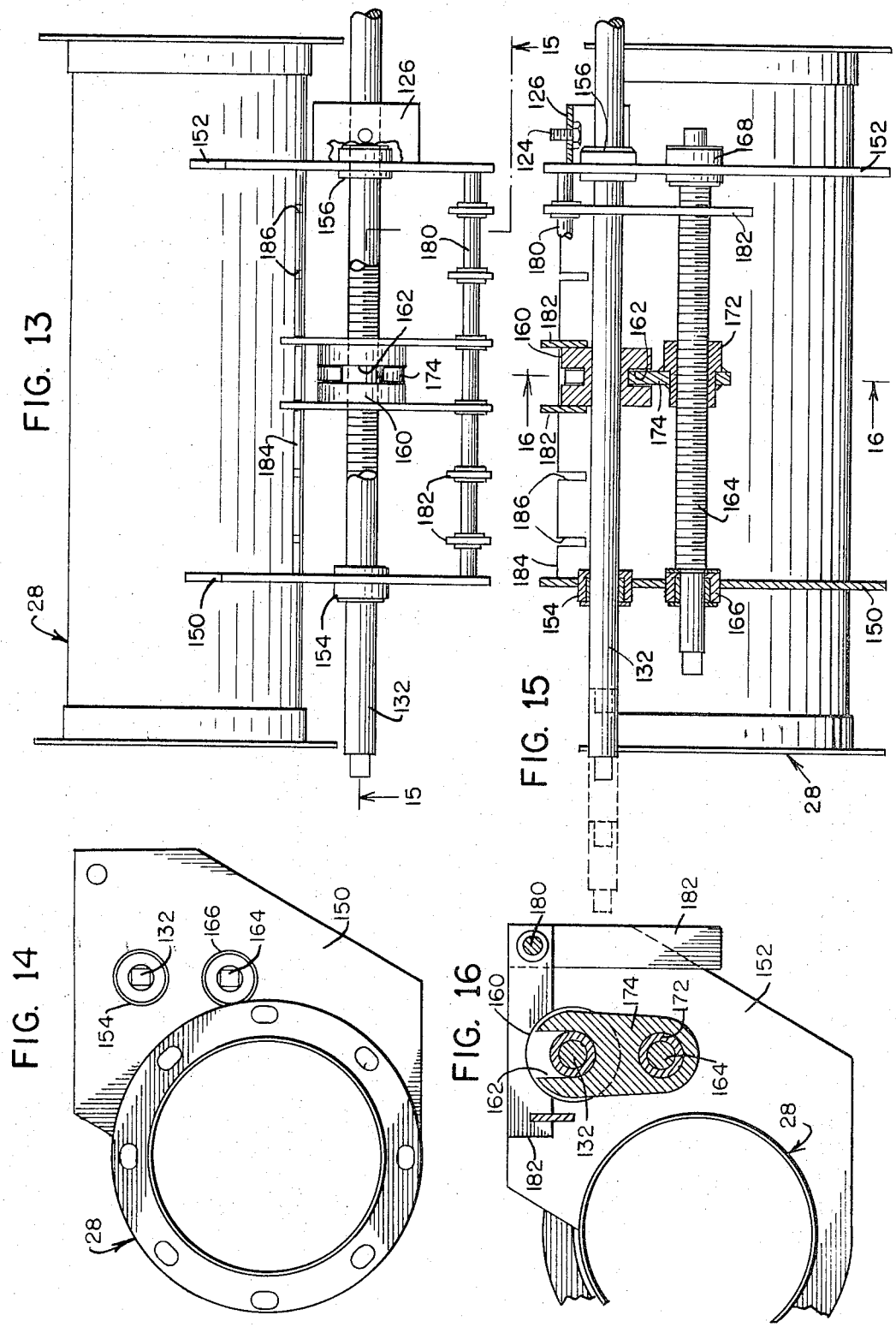

United States Patent Office 3,350,139
Patented Oct. 31, 1967

3,350,139
MATERIALS TRANSPORTING APPARATUS
Roland E. Shaddock, Streator, Ill., assignor to The Meyers-Sherman Corporation, Streator, Ill., a corporation of Illinois
Filed July 22, 1966, Ser. No. 567,214
12 Claims. (Cl. 302—27)

This invention relates to materials transporting apparatus. More particularly, the invention relates to apparatus for transporting granular materials from storage bins and the like.

Various methods and apparatus are employed for transporting granular materials such as grain from storage bins and the like. Augers frequently are laid on bin floors and employed for moving the materials. However, augers suffer from lack of flexibility. In order to remove all of the material, additional equipment is required, such as auxiliary augers and shovels. Flight type conveyors of the cup or bucket and chain type are employed in the bins, but they also are lacking in flexibility and frequently become clogged. Bins having discharge openings in the floor or hopper bins may be employed, but they impose additional structural requirements. Also, such structures frequently can only be provided in a practical manner as original construction. Much of the existing bin construction is provided with continuous flooring and is not well adapted for conversion to discharge through the floor.

An important object of the present invention is to provide apparatus for transporting granular materials which is versatile and adaptable to various storage bins without need for special construction and, especially, is adapted for being placed on the bin floors and submerged in the material to be transported.

Another object is to provide transporting apparatus constructed for selectively withdrawing material from any desired point in a storage bin.

An additional object is to provide apparatus for transporting large quantities of material rapidly and with minimal labor requirements.

A further object is to provide transporting apparatus which may be employed conveniently to remove substantially all of the material from the bin.

Another object is to provide transporting apparatus which is self-cleaning and which does not become fouled by the material to be transported.

An additional object is to provide transporting apparatus which may be operated effectively from outside of a storage bin or from another location remote from the stored material while the bulk of the apparatus is submerged in the material.

A further object is to provide simple, economical, and reliable materials transporting apparatus accomplishing the foregoing objects.

A particular object is to provide pneumatic transporting apparatus accomplishing the foregoing objects, more particularly, apparatus which may be employed in a suction system for transporting granular materials or the like in a stream of air.

These and other objects, advantages and functions of the invention will be apparent on reference to the specification and to the attached drawings illustrating a preferred embodiment of the invention, in which like parts are identified by like reference symbols in each of the views, and in which:

FIG. 3 is an enlarged exploded broken perspective view of a portion of the transporting apparatus, particularly illustrating a conduit intake section and drive apparatus associated therewith;

FIG. 5 is an enlarged side elevational view of a conduit intake section, with parts broken away, and a fragmentary elevational view of a flexible intake tube connected thereto;

FIG. 6 is an enlarged fragmentary top plan view of the conduit intake section, with parts broken away, particularly illustrating a receiver therein;

FIGS. 7 and 8 are enlarged end elevational views of the conduit intake section, with parts broken away, illustrating the receiver open and closed in the respective views;

FIG. 13 is a further enlarged top plan view of the terminal section and control apparatus, with parts broken away;

FIG. 14 is an end elevational view of the apparatus of FIG. 13;

FIG. 15 is a side elevational and longitudinal sectional view of the apparatus of FIG. 13, with parts broken away, taken on lines 15—15 of FIG. 13; and FIG. 16 is a cross sectional view of the apparatus of FIG. 13, taken on line 16—16 of FIG. 15.

In certain of its broader aspects, the materials transporting apparatus of the invention adapted for being submerged in the material to be transported includes the combination of a tubular flow conduit, means providing a plurality of intake ports in spaced relation along the conduit, a closure movable for opening and closing each of the ports, driven means associated with each closure for moving the closure thereby, a drive shaft extending along the conduit, means mounting the shaft for axial reciprocal movement between selected positions and for rotational movement about its axis, and plural drive means on the shaft engageable respectively with the driven means for moving the closures upon rotation of the shaft, the drive means being disposed for selective engagement with respective driven means in selected different positions of the shaft. In a preferred embodiment of the invention, the transporting apparatus includes plural intake port means on the conduit having means for connecting an intake tube thereto, and a flexible intake tube connectable to the connecting means.

Figure 1:
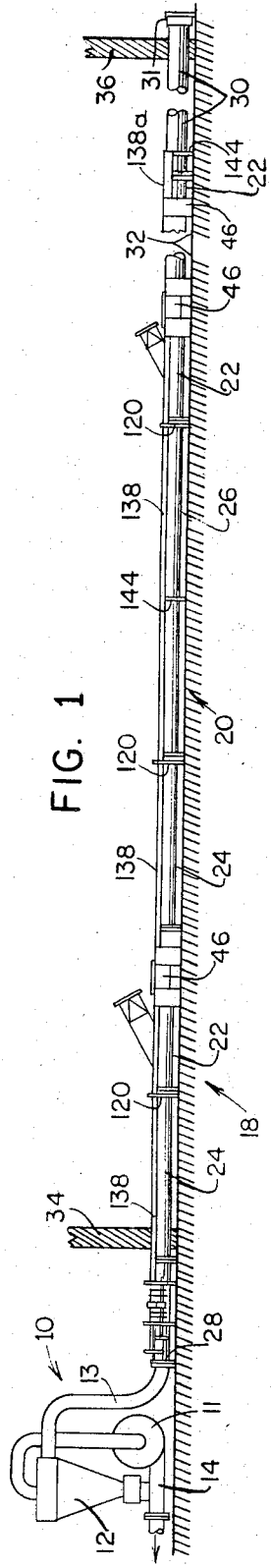
FIGURE 1 is a diagrammatic broken elevational view of the transporting apparatus of the invention mounted in a grain storage bin and connected to a pneumatic conveyor.

Referring to the drawings, particularly FIG. 1, the materials transporting apparatus of the invention is illustrated as it is employed in a suction system including a conventional pneumatic conveyor 10. The conveyor includes a fan 11, a cyclone separator 12, a suction intake line 13, and a pressure discharge line 14. The fan creates a stream of air in the intake line for picking up and transporting granular material. The material is separated from the air stream in the separator and dropped through a valve into the discharge line, from whence it is conveyed in a discharge stream of air to any desired location. Such a conveyor is disclosed in U.S. Patent No. 2,991,883, for example. The conveyor may be incorporated in a stationary installation, or it may be portably mounted, as desired.

Figure 2:
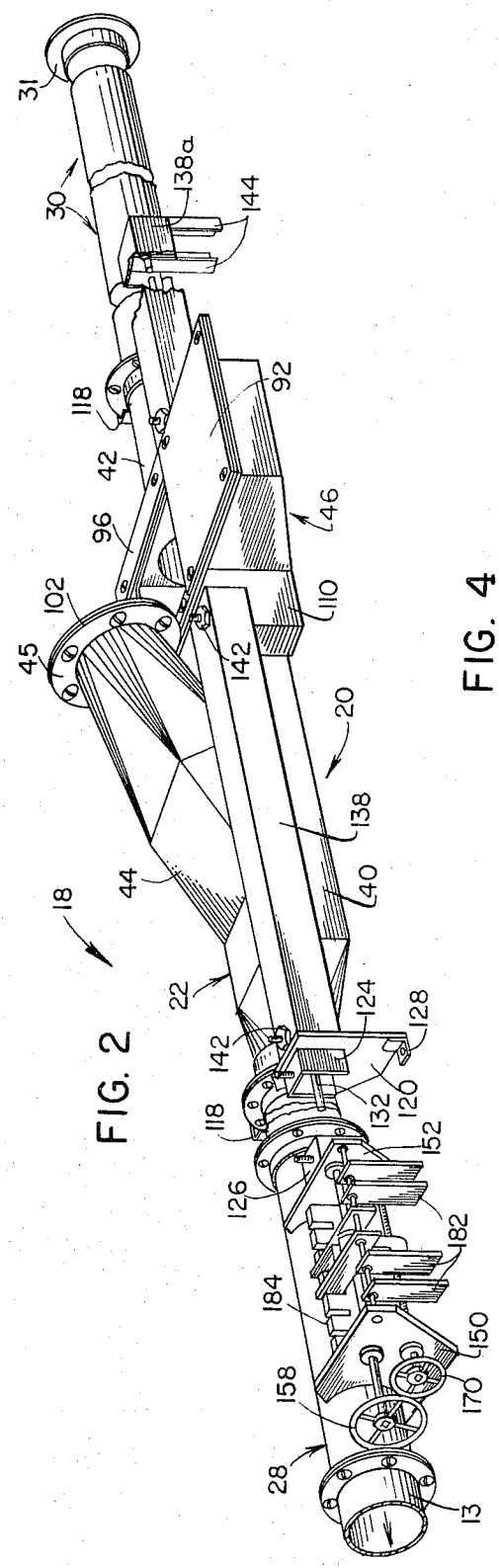
FIG. 2 is a broken perspective view of the transporting apparatus, particularly illustrating one of a plurality of like conduit intake sections therein, and control apparatus at one end thereof.

Referring to FIGS. 1–3, a preferred embodiment of materials transporting apparatus 18 includes a tubular flow conduit 20 having a plurality of intake sections 22, a plurality of short and long connecting sections 24 and 26, and front and rear terminal sections 28 and 30 at opposite ends of the conduit. A cap 31 is removably mounted on the outer end of the rear terminal section. For convenience of illustration, FIG. 2 includes but one intake section 22 and the terminal sections 28 and 30.

The apparatus 18 is illustrated in FIG. 1 as mounted on the floor 32 of a conventional grain storage bin, with the front and rear terminal sections 28 and 30 of the conduit extending through respective opposite side walls 34 and 36 of the bin. The front terminal section 28 is connected to the suction intake line 13 of the conveyor 10 outside of the bin.

The flow conduit sections have circular or rectangular-circular tubular configurations and flanged ends. The connecting and terminal sections 24, 26, 28 and 30 are constructed of circular tubes or pipes. Each conduit intake section 22 includes main duct members 40 and 42 having end flanges 41 and 43, respectively, and a branch intake duct member 44 having an end flange 45. One main duct member 40 and the branch duct member 44 are constructed of tubes having generally rectangular cross sections changing to circular at their outer ends. The remaining main duct member 42 is constructed of a circular tube. The several members may be constructed in other configurations if desired. A box-like gravity receiver 46 is interposed between the main duct members 40 and 42 and secured thereto, as by welding. Welded construction is employed for permanent joints throughout the illustrative preferred apparatus, and the conduit sections are connected by bolting together their adjacent flanges.

Referring especially to FIGS. 3 and 5–8, the receiver 46 includes a bottom wall having normally horizontal and upwardly inclined portions 50 and 52, respectively, parallel side walls 54 and 56, parallel end walls 58 and 60, and an upper rectangular peripheral flange 62 integral with the side and end walls. A normally vertical partition 64 having a notch 66 in the center of its upper end divides the receiver into a receiving compartment 68 and a gear comparement 70. The receiving compartment provides a main intake port 72 defined by the flange 62 and the partition 64. The inner ends of the main duct members 40 and 42 communicate with the receiving compartment and the main port through corresponding openings in the respective end walls 58 and 60. The end walls also are provided with opposed shaft openings 74 in the gear compartment.

The receiver flange 62 is provided with threaded holes 76 and 78 on each side at opposite ends thereof, and threaded holes 80 and 82 on each side intermediate the ends. A U-shaped guide bar 84 is seated on the flange, forming an inner ledge 86 on the flange around the guide bar (see FIG. 6). A sliding door or gate 88 is seated on the ledge within the guide bar. A rack 90 is centrally mounted on the underside of the door in register with the partition notch 66. A cover 92 is mounted on the closed end of the guide bar 84, over the gear compartment 70 and above the door. The cover and the guide bar are secured to the receiver flange 62 by screws 94 received in the theraded holes 78 and 82 in the flange.

Two retainer bars 96 are mounted on the open end of the guide bar above the door. The retainer bars extend inwardly over the ledge 86 and are spaced thereabove. The retainer bars and the guide bars are secured to the receiver flange 62 by screws 98 received in the threaded holes 76 and 80 in the flange.

The door 88 is slidable on the ledge 86 between opposite ends of the guide bar 84. The door is retained in place by the cover 92 and the retainer bars 96 thereover. As illustrated in FIGS. 6–8, the door moves from a position wherein the main port 72 is fully open, shown in FIG. 7, to a position wherein the port is completely closed, shown in FIG. 8. The door is shown in an intermediate position in FIG. 6.

The branch duct member 44 is mounted on the normally upper side of the main duct member 40 in angular relation thereto. The members converge in the normal direction of flow through the main duct member. The flanged outer end of the branch duct member forms an intake port 100 spaced outwardly above the main intake port 72 adjacent thereto. As seen in FIG. 3, the branch intake port is closed by a blank closure plate or cap 102 secured to the flange 45 when not in use. As seen in FIG. 5, a flexible tube 104 is connected to the branch duct member 44 when in use. One end of the tube is secured around a circular flanged coupling member 106 by a band or clamp 108, and the coupling member is secured to the branch duct member flange 45 by bolts 109.

Two supports 110 in the form of upstanding channel members are secured to the receiver end walls 58 and 60, respectively, on one side of each intake section 22, and they enclose the shaft openings 74 in the walls. A mounting plate 112 is secured in the upper end of each support, and a bolt 114 is secured to each plate and extends upwardly therefrom. A sleeve bearing 116 is mounted in a corresponding opening in the end wall of each support, in alignment with the shaft openings 74. An angle bar support 118 is secured to the flange 43 of each circular main duct member 42 on the opposite side of each intake section from the channel member supports. The channel member supports and the angle bar support serve for mounting the intake sections on the floor.

Figure 11:
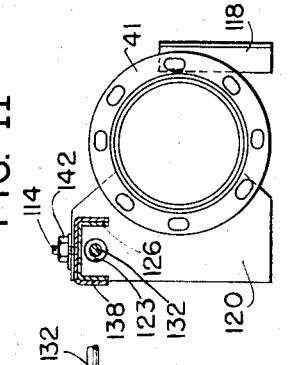
FIG. 11 is a cross sectional view taken on line 11—11 of FIG. 9, illustrating additional supporting structure.
Figure 9:
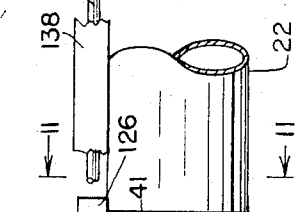
FIG. 9 is an enlarged broken fragmentary side elevational view of the transporting apparatus illustrating supporting structure therein.
Figure 10:
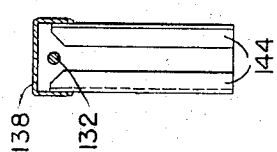
FIG. 10 is a cross sectional view taken on line 10—10 of FIG. 9, illustrating part of the supporting structure.
Figure 12:
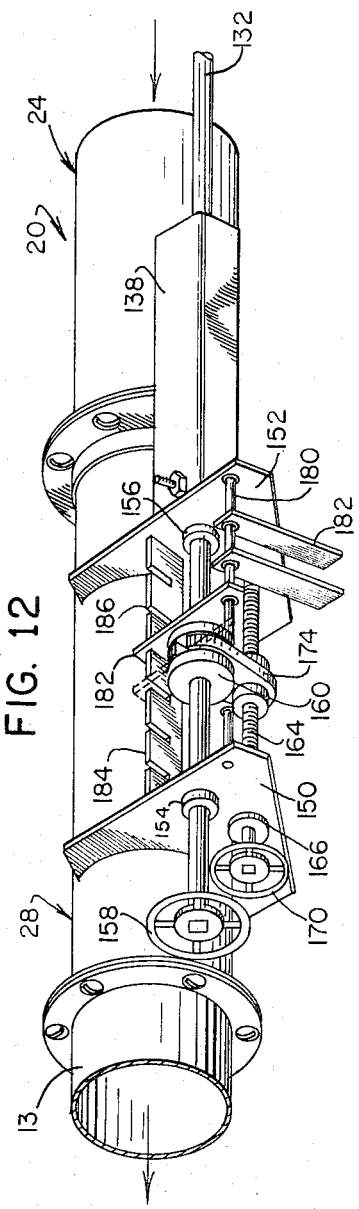
FIG. 12 is an enlarged perspective view of a portion of the transporting apparatus, with parts broken away, illustrating a terminal conduit section and control apparatus thereon.

Additional support for the conduit 20 is provided at its joints between the intake sections 22 and the connecting sections 24 and 26. FIGS. 3, 9 and 11 illustrate the supporting structure at a joint between a long connecting section 26 and an intake section 22. A plate support 120 is secured to the flange 122 of the connecting section on one side thereof, and an angle bar support 118 is secured to the flange on the opposite side of the section. Both supports are welded to the flange. A fastening bracket 128 in the form of a small angle is secured to the base of each plate support, and a bolt hole 130 is provided therein for fastening the support to the floor 32. The joints between one short connecting section 24 and an intake section 22, and between the long connecting sections 26 and the short connecting sections 24, shown in FIG. 1, are supported in like manner to the joints between the intake sections 22 and the long connecting sections 26.

The plate support 120 is mounted on the same side of the conduit 20 as are the channel member supports 110 secured to the receiver 46. A shaft opening 123 is provided in the plate support in alignment with the sleeve bearings 116 in the channel member supports 110. Mounting brackets 124 and 126 are secured to the upper end of the plate support on opposite sides thereof, and a bolt 114 is secured to each bracket and extends upwardly therefrom.

Referring also to FIGS. 4–8, a drive or control shaft 132 extends along the flow conduit 20 and is mounted on the conduit for axial reciprocal movement between selected positions and for rotational movement about its axis. The shaft is constructed of cylindrical rod lengths joined together by couplings 134. The shaft extends through the shaft openings 123 in the plate supports 120 (see FIG. 11) and through the shaft openings 74 in the receiver end walls 58 and 60 (see FIG. 3), and is journaled in the bearings 116 in the channel member supports 110. A drive pinion 136 is secured on the shaft for engagement with the rack 90 of each receiver 46.

Figure 4:
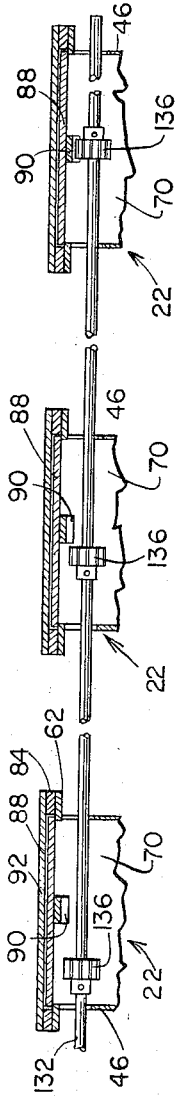
FIG. 4 is a schematic fragmentary broken and sectional view of the drive apparatus and several conduit intake sections, illustrating the cooperative relationship thereof.

The drive shaft 132, the pinions 136, and the racks 90 constitute a drive transmission for operating the sliding doors 88 selectively. In the illustrative preferred embodiment, the pinions are mounted on the shaft so that but one pinion and one rack are engaged at a time. Thus, as illustrated in FIG. 4, when the right-hand pinion 136 engages its rack 90 in the center of the gear compartment 70, the remaining pinions are separated from their racks and are disposed at successively greater distances therefrom. As the shaft 132 is moved to the right, as viewed in FIG. 4, successive pinions engage their respective racks as preceding pinions move out of engagement with their racks. The order of engagement is reversed as the shaft is moved from right to left. The movement of the pinions is accommodated by the shaft openings 74 in the receiver end walls 58 and 60, which permit the pinions to move into and out of the channel member supports 110 as the shaft is moved axially.

Referring especially to FIGS. 2, 3, and 9–11, shaft covers 138 in the form of inverted channel members are provided for the drive shaft 132. Bolt openings 140 are provided in the covers at opposite ends thereof. The ends of the covers are mounted on top of the channel member supports 110 secured to the receiver 46, on top of the mounting brackets 124 and 126 on the plate supports 120, and on similar brackets in other locations. The bolts 114 extend through the bolt openings 140, and the covers are secured in place by nuts 142. The shaft covers extending between the ends of the long conduit sections 26 also are supported on the floor at their midpoints by legs 144 in the form of upright angles, which are secured to the covers. A rear terminal shaft cover 138a likewise is supported at its end by legs 144. The shaft covers maintain the weight of the granular material off of the shaft and also cover the upper ends of the channel member supports 110.

Referring to FIGS. 1, 2 and 12–16, the flow conduit 20 is constructed of a predetermined number of intake sections 22, as determined by the length or width of the storage bin. For example, one intake section may be provided for each twenty feet of bin length or width. Successive intake sections are interconnected by one short connecting section 24 and one long connecting section 26. As previously described, the terminal sections 28 and 30 extend through the bin walls 34 and 36, or through suitable partitions, so that the ends of the flow conduit are outside of the bin. The drive shaft 132 extends along the flow conduit from the rearmost intake section in the conduit to the front terminal section 28 outside of the bin, where the shaft terminates. The entire length of the shaft is covered by the shaft covers 138.

Two transversely extending mounting plates 150 and 152 are secured to the front terminal section 28 in spaced apart relation therealong, and they support the section on the floor 32. Sleeve bearings 154 and 156 are mounted in longitudinal alignment in corresponding openings in the mounting plates, and the front end of the drive shaft 132 is journaled therein. A shaft cover mounting bracket 126 of the type previously described is secured to the inside of the inner mounting plate 152 over the shaft bearing 156, and a mounting bolt 114 is secured to the bracket. The outer end of a shaft cover 138 is secured to the bracket over the shaft, in the manner previously described.

Control apparatus is associated with the terminal section of the drive shaft 132. A wheel 158 or other suitable turning means is secured to the outer end of the shaft. A spool 160 having a circumferential central groove 162 is fixed to the drive shaft between the mounting plates 150 and 152. An adjusting screw 164 is journaled in sleeve bearings 166 and 168 mounted in the respective mounting plates 150 and 152 below the drive shaft. The outer end of the screw projects beyond the outer mounting plate 150, and a handwheel 170 is secured thereto. The screw engages a threaded sleeve 172 between the mounting plates. A yoke 174 is secured to the sleeve, and arms 176 of the yoke are received in the groove 162 of the spool for interengaging the sleeve and the spool.

A mounting rod 180 extends between the mounting plates 150 and 152 and is secured thereto above and spaced outwardly from the drive shaft 132. In the illustrative embodiment, six indexing and locking bars 182 are pivotally mounted on the mounting rod in spaced relation therealong. A holder 184 for the locking bars 182 extends between the mounting plates 150 and 152 and is secured thereto on the inner side of the drive shaft and spaced therefrom. The holder is provided with vertical slots 186 aligned transversely with the locking bars and corresponding in number thereto. The bars hang from their mounting rod, and they may be pivotally moved to positions over the shaft and seated in the holder slots. Pairs of adjacent bars are spaced apart a distance equal to the width of the spool 160, so that they may be placed on opposite sides of the spool to lock the spool and the drive shaft secured thereto in position. The illustrative apparatus provides for locking the spool and shaft in any one of five different positions.

In operation, the main intake ports 72 in the intake sections 22 initially are closed by the sliding doors 88. The branch intake ports 100 initially are closed by the closure plates 102. The flow conduit 20 is submerged in grain or other granular material stored in the bin between the walls 34 and 36. The grain is supported over the drive shaft 132 by the covers 138, and the door racks 90 and the drive pinions 136 are covered and isolated from the grain to prevent fouling.

When it is desired to remove grain from the bin, the cap 38 is removed from the rear terminal conduit section 30, and the front terminal conduit section 28 is connected to the suction intake line 13 of the pneumatic grain conveyor 10. The conveyor is placed in operation, and the resulting application of suction to the flow conduit 20 induces air to enter the open end of the rear terminal section 30 and flow rapidly through the conduit from the rear end to the front end.

Grain is removed from any desired location in the storage bin by adjusting the position of the drive shaft 132 for operating the sliding door 88 on the receiver 46 of the appropriate intake section 22. For this purpose, an appropriate one of the indexing and locking bars 182 is placed in the corresponding slot 186 in the holder 184, to provide a stop for the spool 160 and thereby serve for indexing the drive shaft. The adjusting screw 164 is turned by its handwheel 170 in the proper direction to bring the spool up against the indexing bar and move the shaft axially or longitudinally with the spool into the desired position. A second bar 182 on the opposite side of the spool then is placed in the corresponding slot 186 in the holder, thereby locking the spool in position between the bars and preventing the drive shaft from moving axially while allowing the shaft to rotate. At this time, the rack 90 of the selected intake section is engaged by its drive pinion 136.

The sliding door 88 then may be opened by turning the shaft handwheel 158 in the appropriate direction. Grain flows by gravity through the main intake port 72 into the receiving compartment 68, where it is entrained in the stream of air flowing through the conduit and transported along the conduit to the conveyor 10 outside of the bin. After removing the desired quantity of grain from the selected location, the door 88 is closed by turning the shaft handwheel 158 in the opposite direction.

When it is desired to remove grain from any other location, the sliding door 88 of the intake section 22 in that location is opened in like manner. Thus, the indexing and locking bars 182 engaging the spool 160, as described above, are pivoted out of engagement with the spool, and another bar is moved over the shaft into its holder slot 186 for indexing the shaft in the appropriate new position. The shaft is axially moved by operation of the adjusting screw 164 until the spool 160 engages the indexing bar, after which a second bar is moved over the shaft into its slot on the opposite side of the spool.

The movement of the drive shaft 132 serves to move the drive pinion 136 out of engagement with the rack 90 of the intake section which was selected initially, and move another drive pinion into engagement with the rack of the next selected intake section. Thus, referring to FIG. 4, the shaft may be moved to the right to move the right-hand pinion 136 out of engagement with its rack 90 and move the next succeeding pinion into engagement with its rack. The drive shaft handwheel then is turned to open the door 88 of the newly selected intake section and allow grain to flow through the main intake port 72 and into the receiving compartment 68 thereof. After removing the desired quantity of grain, the door is closed by turning the handwheel.

Grain may be removed in like manner through the main intake port of any of the intake sections, in any order. Alternatively, the door on any intake section may be allowed to remain open while the door on one or more of the remaining sections is opened. Grain then may be removed simultaneously at a plurality of intake sections to mix or blend grain from different locations in the bin.

When the grain pile around any intake section is reduced to the point that grain no longer will fall into the receiving compartment, being at its angle of repose adjacent thereto, the grain remaining around the section is removed through the branch duct member 44. For this purpose, the sliding door 88 on the intake section is closed, and the cap 31 is replaced on the rear terminal conduit section 30, to prevent loss of vacuum. Referring to FIG. 5, the flexible tube 104 of appropriate length is connected to the branch duct member, as described above. The remaining grain is removed by suction through the outer end of the flexible tube. The flexible tube then is removed from the branch duct member, and the closure plate 102 is replaced thereon. This procedure is repeated at each intake section in order to unload the bin completely. The bin may be loaded and unloaded repeatedly thereafter in the same manner.

The simple and compact modular construction of the materials transporting apparatus 18 provides for convenient and economical storage and shipment and for rapid and economical installation of conduits of various lengths in storage bins of various dimensions. The apparatus may be installed permanently or semi-permanently in the storage bins, and a number of units may be installed in parallel in large bins. Material may be withdrawn selectively from any desired location in a bin, and the material may be removed completely therefrom, rapidly and with minimum labor requirements. The apparatus has but few moving parts, and they are protected from interference or fouling by the material. The racks and drive pinions are isolated from the material, and the weight of the material is maintained off of the drive shaft, permitting axial and rotational movement of the shaft without resistance from the material. The flow conduit is self-cleaning, and abrasion is low in the pneumatic system.

While a preferred embodiment of the invention has been described and illustrated, it will be apparent to those skilled in the art that various changes and modifications may be made therein within the spirit and scope of the invention. It is intended that such changes and modifications be included within the scope of the appended claims.

What is claimed is:

1. Granular materials transporting apparatus adapted for being submerged in the material to be transported which comprises, in combination, a tubular flow conduit, means providing a plurality of intake ports in spaced relation along said conduit, a closure movable for opening and closing each of said ports, driven means associated with each said closure for moving the closure thereby, a drive shaft extending along said conduit, means mounting said shaft for axial reciprocal movement between selected positions and for rotational movement about its axis, and plural drive means on said shaft engageable respectively with said driven means for moving said closures upon rotation of said shaft, said drive means being disposed for selective engagement with respective driven means in selected different positions of said shaft.

2. Apparatus as defined in claim 1 including means associated with said shaft for moving the shaft between said positions.

3. Apparatus as defined in claim 1 including plural intake port means on said conduit having means for connecting an intake tube thereto.

4. Apparatus as defined in claim 3 including a plurality of conduit intake sections each having an intake port arranged for gravity flow of material therethrough, and a branch intake member projecting outwardly from such port and terminating in a second intake pot for connection to an intake tube.

5. Apparatus as defined in claim 4 including a flexible intake tube having means for connection to a branch intake member.

6. Apparatus as defined in claim 4 including an additional conduit section, means mounting said shaft on said intake and additional sections, interengageable means on said shaft and said additional section respectively for moving the shaft between said positions, and interengageable stops means on said shaft and said additional section respectively for indexing said shaft in said positions.

7. Granular materials transporting apparatus adapted for being submerged in the material to be transported which comprises, in combination, a tubular flow conduit comprising a plurality of intake sections, means providing a first intake port in each of said intake sections arranged for gravity flow of material therethrough, a sliding door for said first port mounted on each intake section, a rack on each of said doors, a branch intake member in each of said intake sections projecting outwardly from said first port and terminating in a second intake port, means on said branch intake member for connecting an intake tube thereto, a drive shaft extending along said conduit, means mounting said shaft on said conduit for axial reciprocal movement between selected positions and for rotational movement about its axis, and drive pinions on said shaft engageable respectively with said racks, said pinions being disposed for selective engagement with respective racks in selected different positions of said shaft.

8. Apparatus as defined in claim 7 including an additional conduit section, means mounting said shaft on said additional section, interengageable means on said shaft and said additional section respectively including screw means on said additional section for moving said shaft between said positions, and interengageable stop means on said shaft and said additional section respectively for indexing and locking said shaft in said positions.

9. Apparatus as defined in claim 8 including a shaft cover for supporting the material over said shaft.

10. In a suction system for transporting granular materials in a stream of air, transporting apparatus adapted for being submerged in the material to be transported which comprises, in combination, a tubular flow conduit having one end connected to a suction source, means providing a plurality of intake ports in spaced relation along said conduit, a closure movable for opening and closing each of said ports, driven means associated with each said closure for moving the closure thereby, a drive shaft extending along said conduit, means mounting said shaft for axial reciprocal movement between selected positions and for rotational movement about its axis, and plural drive means on said shaft engageable respectively with said driven means for moving said closures upon rotation of said shaft, said drive means being disposed for selection engagement with respective driven means in selected different positions of said shaft.

11. A system as defined in claim 10 including a pneumatic conveyor having a suction intake line and a pressure discharge line, wherein said conduit end is connected to said intake line.

12. A system as defined in claim 10 including a plurality of conduit intake sections each having an intake port arranged for gravity flow of material therethrough, and a branch intake member projecting outwardly from such port and terminating in a second intake port for connection to an intake tube.

References Cited

UNITED STATES PATENTS

| | | | |
|---|---|---|---|
| 1,124,825 | 1/1915 | Whartnaby et al. | 214—83.2 |
| 2,030,553 | 2/1936 | Tiley | 302—52 |
| 2,534,807 | 12/1950 | Allen | 302—52 |
| 2,650,726 | 9/1953 | Aller et al. | 302—52 |

ANDRES H. NIELSEN, *Primary Examiner.*